US011584500B1

(12) United States Patent
Foulkes et al.

(10) Patent No.: US 11,584,500 B1
(45) Date of Patent: Feb. 21, 2023

(54) SYSTEMS AND METHODS FOR ABSORBING SHOCK WITH COUNTER-ROTATING PROPELLER SHAFTS IN A MARINE PROPULSION DEVICE

(71) Applicant: Brunswick Corporation, Mettawa, IL (US)

(72) Inventors: David M. Foulkes, Lake Bluff, IL (US); John A. Tuchscherer, Oshkosh, WI (US); Brett Bielefeld, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/745,517

(22) Filed: May 16, 2022

Related U.S. Application Data

(63) Continuation of application No. 16/723,228, filed on Dec. 20, 2019, now Pat. No. 11,364,987.

(51) Int. Cl.
| | | |
|---|---|---|
| *B63H 23/34* | (2006.01) | |
| *B63H 23/32* | (2006.01) | |
| *B63H 23/08* | (2006.01) | |
| *B63H 20/20* | (2006.01) | |
| B63H 5/10 | (2006.01) | |
| B63H 23/30 | (2006.01) | |
| B63H 1/15 | (2006.01) | |

(52) U.S. Cl.
CPC ............ *B63H 23/34* (2013.01); *B63H 20/20* (2013.01); *B63H 23/08* (2013.01); *B63H 23/321* (2013.01); *B63H 1/15* (2013.01); *B63H 23/30* (2013.01); *B63H 2005/106* (2013.01); *B63H 2023/342* (2013.01)

(58) Field of Classification Search
CPC ........ B63H 23/34; B63H 20/20; B63H 23/08; B63H 23/321; B63H 1/15; B63H 23/30; B63H 2005/106; B63H 2023/342; B63H 2023/323
See application file for complete search history.

(56) References Cited

U.S. PATENT DOCUMENTS

| | | | |
|---|---|---|---|
| 2,362,141 | A | 11/1944 | Loetterle |
| 4,099,478 | A | 7/1978 | Alexander, Jr. |
| 4,223,773 | A | 9/1980 | Croisant et al. |
| 4,373,922 | A | 2/1983 | Weed |
| 4,583,628 | A | 4/1986 | McCormick |
| 4,600,395 | A | 7/1986 | Pichl |
| 4,642,057 | A | 2/1987 | Frazzell et al. |
| 4,792,314 | A | 12/1988 | McCormick |
| 4,795,382 | A | 1/1989 | McCormick |

(Continued)

*Primary Examiner* — Jacob M Amick
(74) *Attorney, Agent, or Firm* — Andrus Intellectual Property Law, LLP

(57) ABSTRACT

A system for rotating a propeller shaft within a gearcase via a driveshaft. A stub shaft is rotatable within the gearcase. A forward gear is rotatably coupled to the stub shaft. The forward gear is rotatable by the driveshaft and is engageable to become rotatably fixed to the stub shaft such that rotating the driveshaft rotates the stub shaft. A shock absorbing coupler is positioned within the gearcase. The shock absorbing coupler couples the stub shaft to the propeller shaft and is torsional such that shock is absorbable between the propeller shaft and the driveshaft.

20 Claims, 7 Drawing Sheets

(56) References Cited

U.S. PATENT DOCUMENTS

| | | |
|---|---|---|
| 4,832,636 A | 5/1989 | McCormick |
| 4,869,121 A | 9/1989 | Meisenburg |
| 4,897,058 A | 1/1990 | McCormick |
| 4,900,281 A | 2/1990 | McCormick |
| 4,925,409 A | 5/1990 | Johnson |
| 4,955,833 A | 9/1990 | Lam et al. |
| 4,986,775 A | 1/1991 | Wantz |
| 5,201,679 A | 4/1993 | Velte, Jr. et al. |
| 5,214,975 A | 6/1993 | Zalewski |
| 5,249,995 A | 10/1993 | Meisenburg et al. |
| 5,366,398 A | 11/1994 | Meisenburg et al. |
| 5,462,463 A | 10/1995 | Meisenburg et al. |
| 5,601,464 A * | 2/1997 | Ogino .................... B63H 23/34 440/75 |
| 5,791,950 A | 8/1998 | Weronke et al. |
| 5,890,938 A | 4/1999 | Eick et al. |
| 5,902,160 A | 5/1999 | Weronke et al. |
| 6,068,529 A | 5/2000 | Weronke et al. |
| 6,176,750 B1 | 1/2001 | Alexander et al. |
| 6,478,543 B1 | 11/2002 | Tuchscherer et al. |
| 7,086,836 B1 | 8/2006 | Sheth et al. |
| 7,188,543 B1 | 3/2007 | Andrews et al. |
| 7,291,048 B1 | 11/2007 | Phillips et al. |
| 7,387,556 B1 | 6/2008 | Davis |
| 8,277,269 B1 | 10/2012 | Alby et al. |
| 10,323,721 B1 | 6/2019 | Smith et al. |
| 10,336,419 B1 | 7/2019 | Guse et al. |
| 10,752,328 B1 | 8/2020 | Bielefeld et al. |
| 2005/0186861 A1 * | 8/2005 | Powers .................. F16D 47/02 440/49 |
| 2009/0129930 A1 | 5/2009 | Janitz |
| 2015/0071780 A1 | 3/2015 | Oh et al. |
| 2015/0098824 A1 | 4/2015 | Oh et al. |
| 2016/0114877 A1 | 4/2016 | Hedlund |
| 2016/0137279 A1 | 5/2016 | Sugiyama et al. |
| 2016/0137280 A1 | 5/2016 | Sugiyama et al. |
| 2016/0194066 A1 | 7/2016 | Lee et al. |
| 2017/0159705 A1 | 6/2017 | Hikosaka |
| 2018/0057134 A1 | 12/2018 | Ebihara |
| 2020/0130794 A1 | 4/2020 | Stanley et al. |
| 2021/0129968 A1 | 5/2021 | Depentori et al. |

* cited by examiner

SYSTEMS AND METHODS FOR ABSORBING SHOCK WITH COUNTER-ROTATING PROPELLER SHAFTS IN A MARINE PROPULSION DEVICE

CROSS REFERENCE TO RELATED APPLICATION

This application is a continuation of U.S. patent application Ser. No. 16/723,228, filed Dec. 20, 2019, which is incorporated herein by reference in its entirety.

FIELD

The present disclosure generally relates to systems and methods for rotatably supporting and absorbing shock in counter-rotating propeller shafts in a marine propulsion device, and more particularly to systems and methods enabling the incorporation of additional bearings and a shock absorbing coupler for rotatably supporting and absorbing shock in the propeller shafts.

BACKGROUND

The following U.S. Patents and Patent Applications provide background information and are incorporated by reference in entirety.

U.S. Pat. No. 4,832,636 discloses a marine drive unit, which includes a lower torpedo housing. At least one propeller shaft is mounted in the housing for rotation about a drive axis. The propeller shaft is driven by a driving gear suitably connected to a marine engine and mounted on the drive axis. A first forward thrust bearing is disposed between the driving gear and the housing. In addition, a second forward thrust bearing is disposed adjacent the forward end of the propeller shaft. A pre-loading device, in the present embodiment a washer-like Belleville spring of a desired capacity, is disposed to provide an adjustable rearwardly biasing force on the second thrust bearing.

U.S. Pat. No. 4,925,409 discloses a torsional damper for interconnecting the engine crankshaft and the driveshaft in a marine drive unit which utilizes a high viscosity fluid as the fluid drive medium and also to cushion the transmission from the crankshaft to the driveshaft of torsional vibrations created by peak engine firing impulses. The damper includes two sets of interleaved and overlapping damper plates disposed within a housing. One set of plates is attached to the crankshaft input for relative rotation therewith and the other set is attached to the driveshaft and driven by the high shear resistance of the transmission fluid. The extremely high viscosity fluid reduces slip between the plate sets and thus between the crankshaft and driveshaft to a minimum, yet effectively precludes the transmission of torsional vibrations which significantly reduce drive train life. The damper construction of the present invention may be adapted for use in both outboard motors and stern drives.

U.S. Pat. No. 7,086,836 discloses a torque transfer mechanism for a marine propulsion system, which provides a connector mechanism, a first torque transfer mechanism, and a second torque transfer mechanism. A plurality of rods can provide the first torque transfer mechanism and a polymer component is shaped to provide the second torque transfer mechanism. All torque below a preselected magnitude is transferred through the first torque transfer mechanism and, for magnitudes of torque above the threshold, torque is transferred by both the first and second torque transfer mechanisms. The connector mechanism has an outer surface that is not used to transfer torque between it and an inner hub of a propulsor.

U.S. Pat. No. 10,336,419 discloses shock absorbing hub assemblies and methods of making the same for marine propulsion devices having a propeller shaft and propeller. The assembly has an adapter component having an inner bore that engages the propeller shaft's splined outer surface and having a body with axially extending engagement surfaces on one end and an elastic hub component on an opposite end. The elastic hub component has planar outer engagement surfaces that abut corresponding inner engagement surfaces on the propeller hub's inner bore. Upon initial propeller shaft rotation, the elastic hub component deflects and allows the adapter component to rotationally travel relative to the propeller hub while not rotating the propeller hub. Upon further rotation, the adapter component's axially extending engagement surfaces engage with the propeller hub to rotate the propeller hub. The elastic hub component has a spring rate small enough to reduce clutch rattle yet large enough to isolate transmission shift clunk.

U.S. Patent Application Publication No. 2009/0129930 discloses a propeller for a trolling motor, which has an inner hub and an outer hub. The inner hub is made of a synthetic elastomer so that relative rotational movement between the outer hub and a propeller shaft is permitted. This relative movement dampens the reactive forces during an impact between blades of the propeller and submerged objects, such as weeds. The elastic deformability of the inner hub also reduces noise that can be caused by imbalances contained in the propeller.

U.S. Pat. Nos. 7,291,048, 7,387,556, as well as U.S. Pat. No. 10,752,328 also provide additional information for systems presently known in the prior art.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a system for rotating an inner propeller shaft within a gearcase via a driveshaft. The system includes a stub shaft that extends between forward and aft ends and is rotatable within the gearcase. A forward gear is rotatably coupled to the stub shaft, where the forward gear meshes with the driveshaft and is engageable to become rotatably fixed to the stub shaft such that rotating the driveshaft rotates the stub shaft. A shock absorbing coupler is positioned within the gearcase, where the coupler has forward and aft ends, where the forward end of the coupler is engageable with the aft end of the stub shaft, and where the aft end of the coupler engageable with the inner propeller shaft. The coupler is torsional between the forward and aft ends such that shock is absorbable between the inner propeller shaft and the driveshaft.

Another embodiment generally relates to a marine propulsion device having an engine that rotates a driveshaft. The marine propulsion device includes a gearcase, inner and outer propeller shafts rotatably contained within the gearcase, and a stub shaft extending between forward and aft ends and being rotatable within the gearcase. A reverse gear and a forward gear are each rotatably coupled to the stub shaft, where the reverse gear and the forward gear each mesh with the driveshaft and are engageable to become rotatably fixed to the stub shaft such that rotating the driveshaft rotates the stub shaft in reverse and forward directions, respectively. A shock absorbing coupler couples the stub shaft and the inner propeller shaft, where the coupler is torsional to allow some rotation of the inner propeller shaft relative to the driveshaft. An outer driving gear is coupled to the inner propeller shaft to rotate therewith and an outer driven gear is coupled to the outer propeller shaft to rotate therewith. A pinion rotatably couples the outer driving gear to the outer driven gear such that rotation of the outer driving gear rotates the outer propeller shaft. Clutches engage the forward gear to become rotatably fixed to the stub shaft and engage the reverse gear to become rotatably fixed to the stub shaft, respectively.

Another embodiment generally relates to a method for making a marine propulsion device with shock absorption for inner and outer propeller shafts rotatable within a gearcase by a driveshaft. The method includes positioning a stub shaft within the gearcase, where the stub shaft has a reverse gear and a forward gear rotatably coupled thereto, and where the reverse gear and the forward gear mesh with the driveshaft and are engageable to become rotatably fixed to the stub shaft such that rotating the driveshaft rotates the stub shaft in reverse and forward directions, respectively. The method further includes positioning the inner and outer propeller shafts within the gearcase and coupling the stub shaft to the inner propeller shaft via a shock absorbing coupler to rotate together within the gearcase, where the coupler is torsional to allow some rotation of the inner propeller shaft relative to the driveshaft. The method further includes engaging a pinion between an outer driving gear coupled to the inner propeller shaft and an outer driven gear coupled to the outer propeller shaft such that rotation of the outer driving gear rotates the outer propeller shaft.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Figure 1:
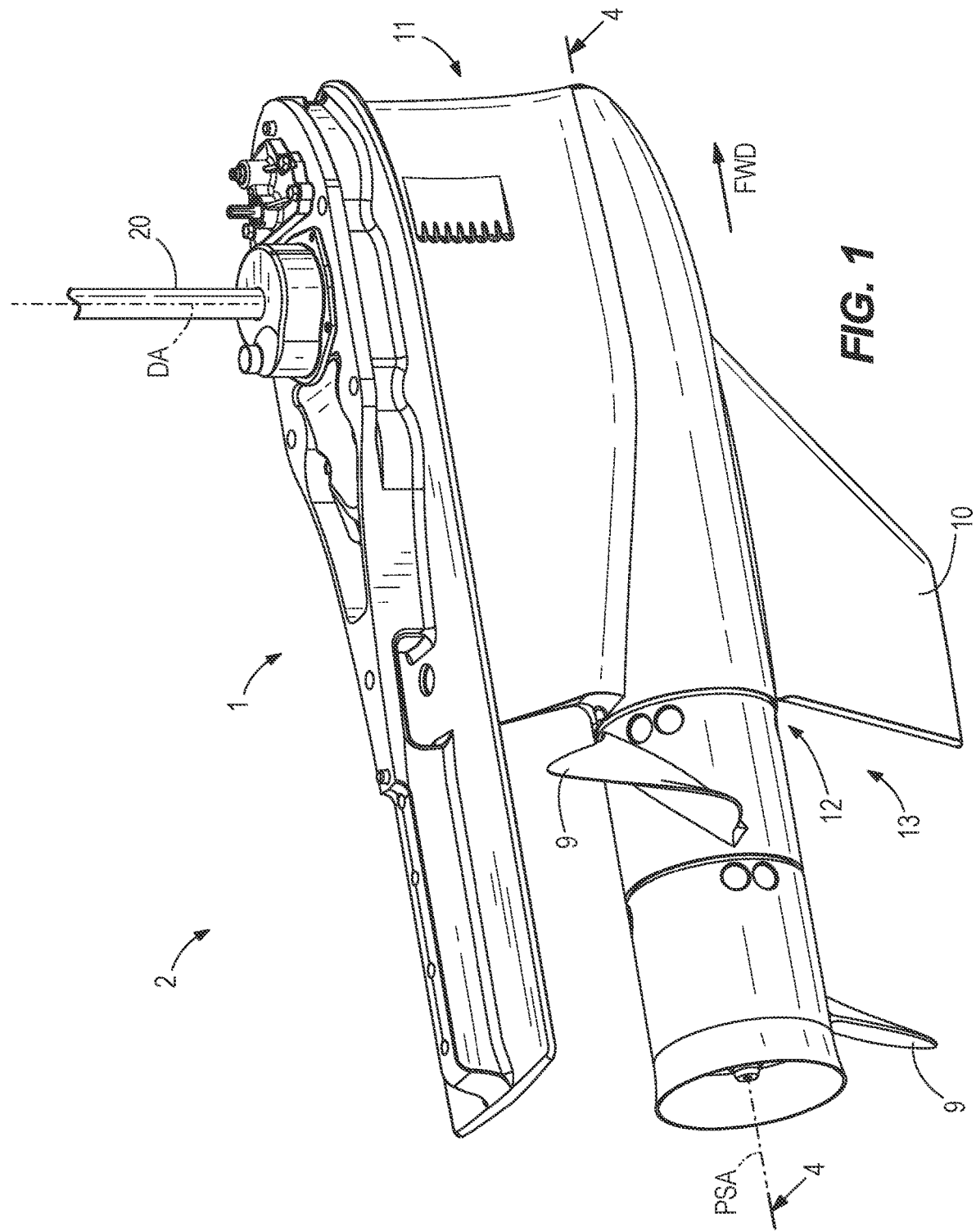
FIG. 1 is an isometric view of a portion of a marine propulsion device incorporating a system according to the present disclosure.

Within the field of marine propulsion devices, including stern drives, outboards, and pod drives, for example, dual, counter-rotating propeller shafts are a known configuration for providing for example, high levels of propulsive power. However, the present inventors have identified that issues have always existed with the ability to assemble and shim the gear meshes within the lower unit of a counter-rotating propeller shaft configuration. Providing a stable and rigid gear mounting system is critical for performance and reliability, specifically by reducing concentrated loading on the bearings and gears. An exemplary configuration of a counter-rotating propeller shaft is shown in U.S. Pat. No. 5,601,464, which is hereby incorporated by reference. The configuration includes both radial bearings and thrust bearings for rotatably supporting the propeller shafts.

However, the inventors have identified that while these bearings may be sufficient for a low-power density drive, they are inadequate for supporting bevel gears in a high power density configuration due to the lack of rotational support at central regions of the propeller shafts leading to misalignment at the gear meshes. Specifically, because propeller shafts are typically installed from a rear or aft opening within the lower gearcase, these propeller shafts (and particularly the bearings that support them) must be spaced far apart from each other due to access limitations within the openings. In other words, there is presently no known system or method for installing bearings near gear meshes that are not at either end of a propeller shaft, specifically for propeller shafts that are inserted from the rear. The result is that the propeller shafts have a tendency to experience large deflections under load, particularly farther away from the bearing support regions. This results in misalignment of the gear mesh, particularly for the gears farthest from the ends of the propeller shafts.

The systems and methods presently disclosed enable additional bearings to be provided across the length of one or more propeller shafts, while still allowing the propeller shafts to be inserted via an opening at the rear of the gearcase as presently known. The systems and methods also enable the respective gears to be pre-loaded against each other, which ensures proper meshing between driving and driven gears, as is discussed further below. For example, preloading may be accomplished by way of proper shimming, or by use of a nut threaded on the inside of a hub of a gear. In contrast to systems and methods known in the art, this provides a robust and stable mounting for each gear, even in a high-power density drive. Moreover, as will become apparent below, the presently disclosed system and method allows the different sets of gears and support bearings to be assembled independently, while nonetheless retaining the ability to insert the propeller shafts through the rear opening of the gearcase. Consequently, this provides easier assembly of the gear sets, including position adjustments through additional shimming.

FIG. 1 depicts an exemplary portion of a marine propulsion device 2 incorporating a system 1 according to the present disclosure. In the example shown, the marine propulsion device 2 includes a driveshaft 20 configured to be rotated about a driveshaft axis DA by an engine in the customary manner, which through gear sets incorporated within the gearcase 10 rotate propeller shafts about a propeller shafts axis PSA extending between a forward end 11 and an aft end 13 of the gearcase 10 to rotate to counter-rotating propellers 9.

Figure 2:
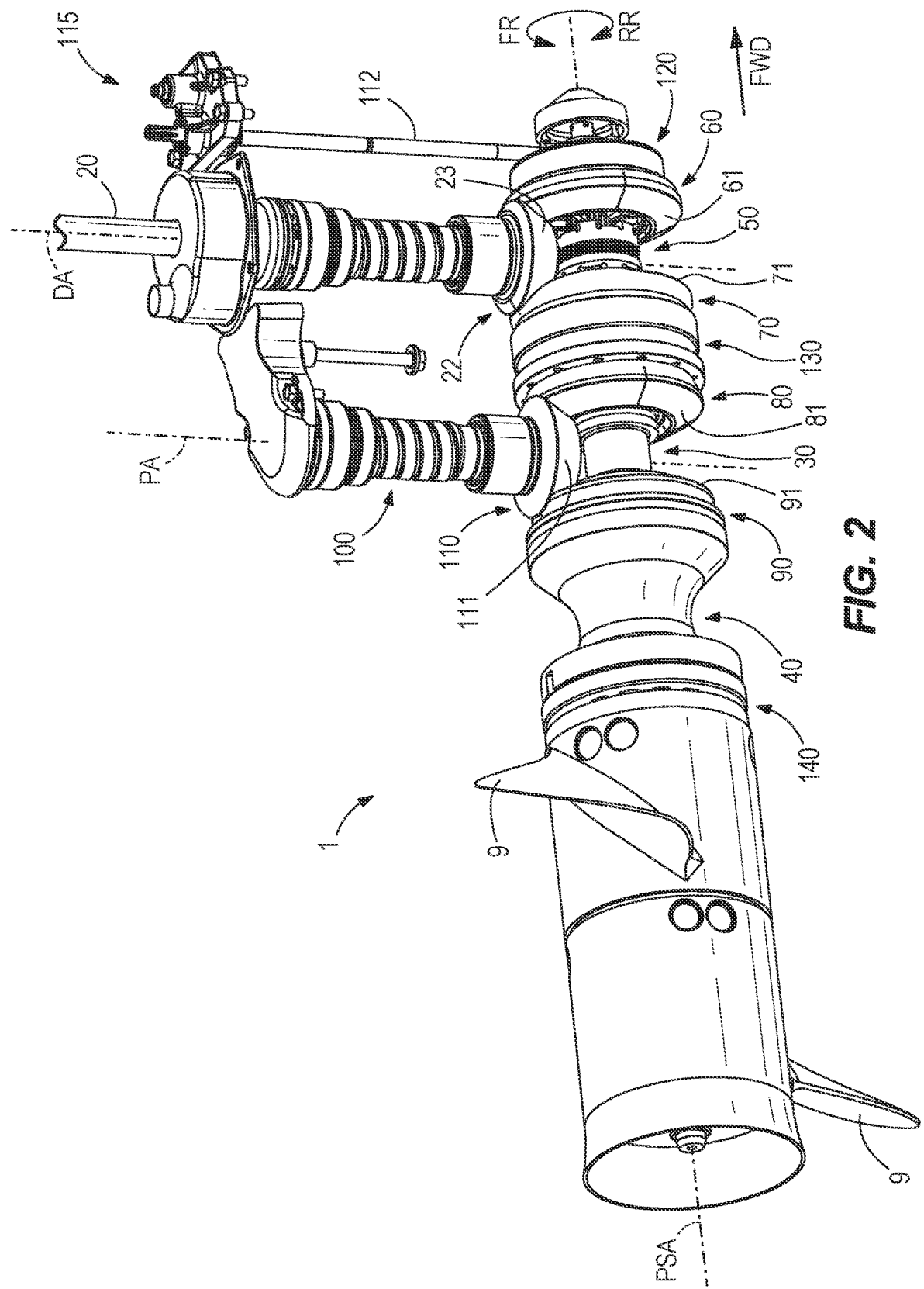
FIG. 2 depicts the system of FIG. 1 assembled outside of the gearcase.
Figure 5:
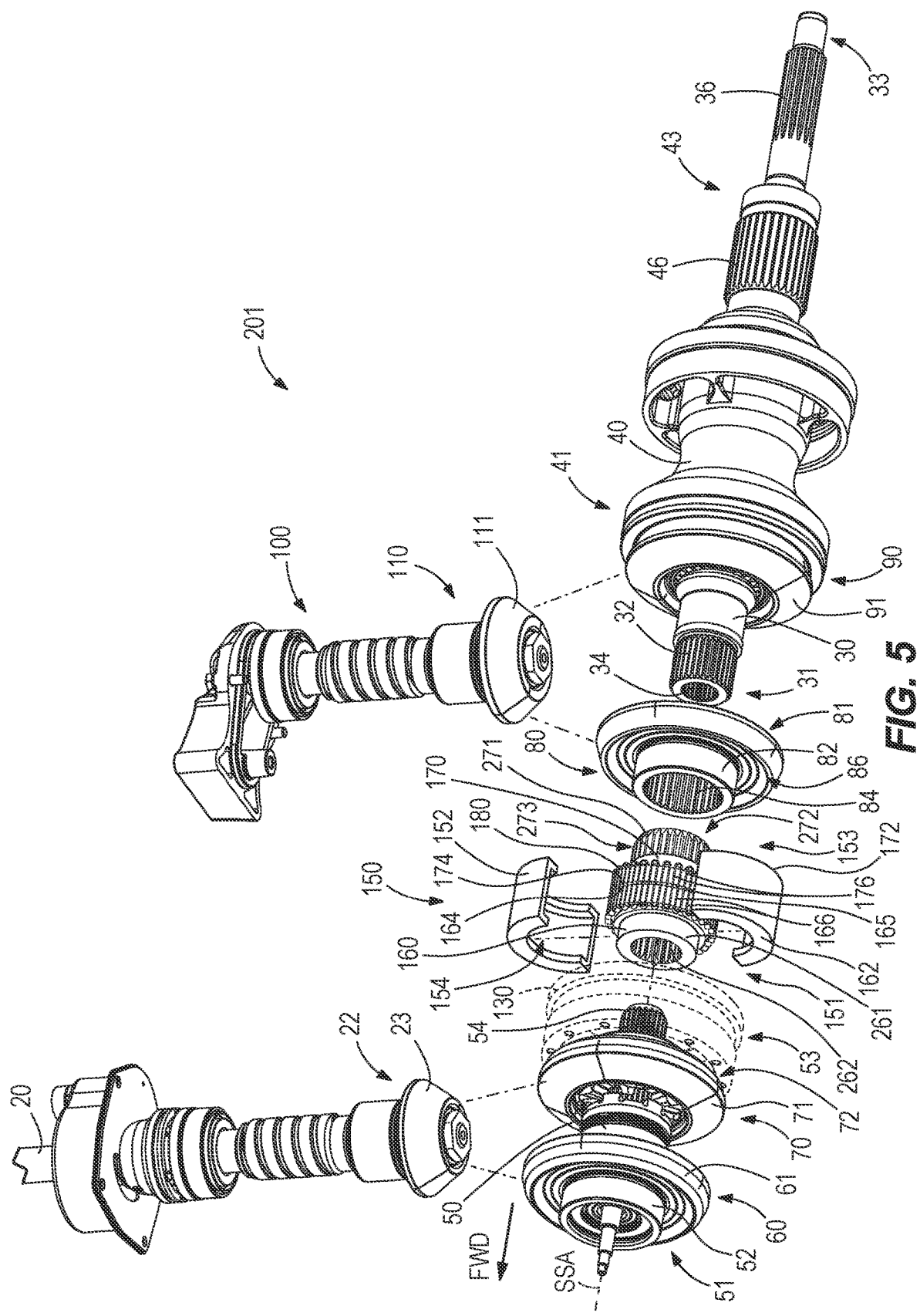
FIG. 5 is an exploded view similar to FIG. 2 of an alternate embodiment according to the present disclosure, now incorporating a shock absorbing coupler.

FIG. 2 depicts the same system 1 without the gearcase 10. As will become apparent in contrast to dual, counter-rotating propeller shaft configurations presently known in the art, power is not transmitted from the driveshaft 20 to the propeller shafts (specifically the inner propeller shaft 30 and outer propeller shaft 40) directly, but through incorporation of an additional stub shaft 50. As also shown in the exploded view of FIG. 3, the stub shaft 50 extends between a forward end 51 and an aft end 53 and rotates about a stub shaft axis SSA. The aft end 53 of the stub shaft 50 has an engagement feature 54 for engaging with the inner propeller shaft 30 such that rotating the stub shaft 50 also rotates the inner propeller shaft 30. In alternative embodiments discussed below, the stub shaft 50 and inner propeller shaft 30 are not rigidly coupled together, but are instead coupled by a shock absorbing coupler 150 (FIG. 5).

Figure 3:
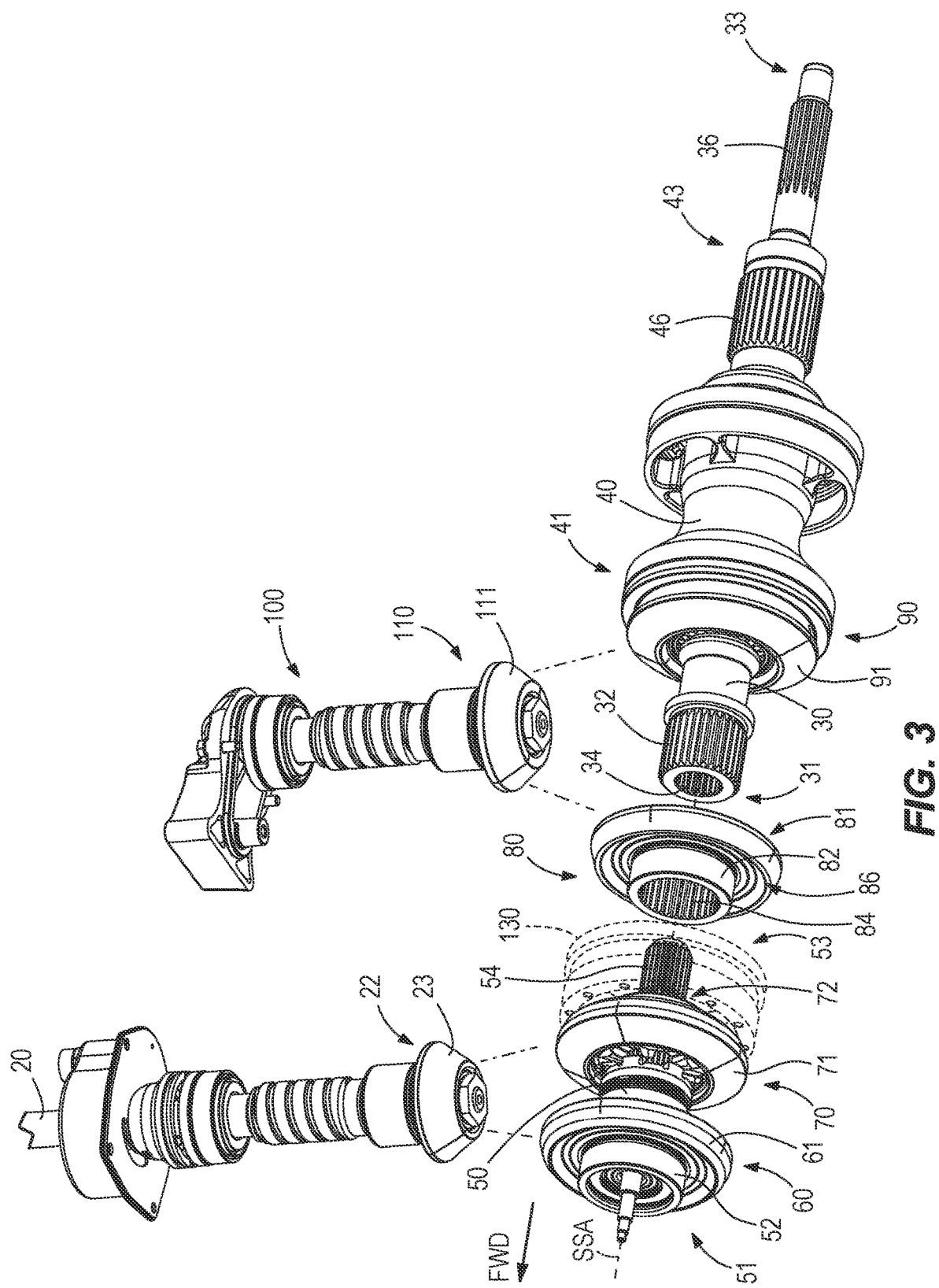
FIG. 3 is an exploded view taken from the opposite side of the system shown in FIG. 2.

In the example shown in FIGS. 2 and 3, a reverse gear 60 and a forward gear 70 each mesh with a drive gear 22 rotated by the driveshaft 20 to rotate therewith. The reverse gear 60 and forward gear 70 are each rotatably coupled to the stub shaft via clutches that allow free rotation of the reverse gear 60 and forward gear 70 about the stub shaft, respectively, when not engaged. Engaging either the clutch associated with the reverse gear 60, or the clutch associated with the forward gear 70, rotatably fixes the reverse gear 60 or the forward gear 70 to the stub shaft 50 such that rotating the driveshaft 20 rotates the stub shaft 50 in a reverse direction RR, or in an opposite forward direction FR, respectively. An exemplary clutch 115 engageable via an actuator 112 in a customary manner known in the art is shown in FIG. 2 for rotatably fixing the reverse gear 60 to the stub shaft 50.

In this manner, rotation of the driveshaft 20 causes rotation of the stub shaft 50 whenever the clutch 115 of either the reverse gear 60 or the forward gear 70 is engaged, particularly via the mesh 23 of the drive gear 22 and either the mesh 61 of the reverse gear 60, or the mesh 71 of the forward gear 70.

In the example shown in FIG. 2, an aft extension 72 of the forward gear 70 opposite the mesh 71, and a forward extension 82 of the outer driving gear 80 opposite the mesh 81, are each configured to be rotatably supported by an intermediate mid bearing 130 via engagement with an interior surface 131 thereof. In this manner, the intermediate mid bearing 130 rotatably supports the stub shaft 50, as well as the inner propeller shaft 30. The inventors have recognized that providing the presently disclosed stub shaft 50 in addition to the inner propeller shaft 30 makes it is possible to incorporate this mid bearing 130 at an intermediate position (here, adjacent to the forward gear 70), which is not possible with systems known in the art.

As shown in FIG. 3, an outer driving gear 80 is also coupled to the inner propeller shaft 30 to rotate therewith. In the example shown, the outer driving gear 80 engages via an inner engagement feature 84 defined therein with the inner propeller shaft 30 via an outer engagement feature 32 defined thereon. Therefore, rotation of the stub shaft 50 in either direction causes rotation of the outer driving gear 80 since each is rotatably fixed to the inner propeller shaft 30.

The outer driving gear 80 is further rotatably engaged via a mesh 81 thereon with a pinion gear 110 rotatably supported by a pinion shaft 100 that rotates about a pinion axis PA. Specifically, the mesh 81 of the outer driving gear 80 engages with a mesh 111 on the pinion gear 110. The pinion gear 110 then transmits rotation from the outer driving gear 80 through the pinion shaft 100 to an outer driven gear 90 via engagement with a mesh 91 thereon. The outer driven gear 90 is coupled to the outer propeller shaft 40, which rotates one of the propellers 9 in a customary manner.

In the example shown, the reverse gear 60, forward gear 70, and drive gear 22, as well as the outer driving gear 80 and an outer driven gear 90 to be discussed below, are each bevel gears having corresponding mesh configurations for engagement therebetween. Exemplary mesh arrangements include straight splines, helical splines, or other configurations presently known in the art.

Figure 4:
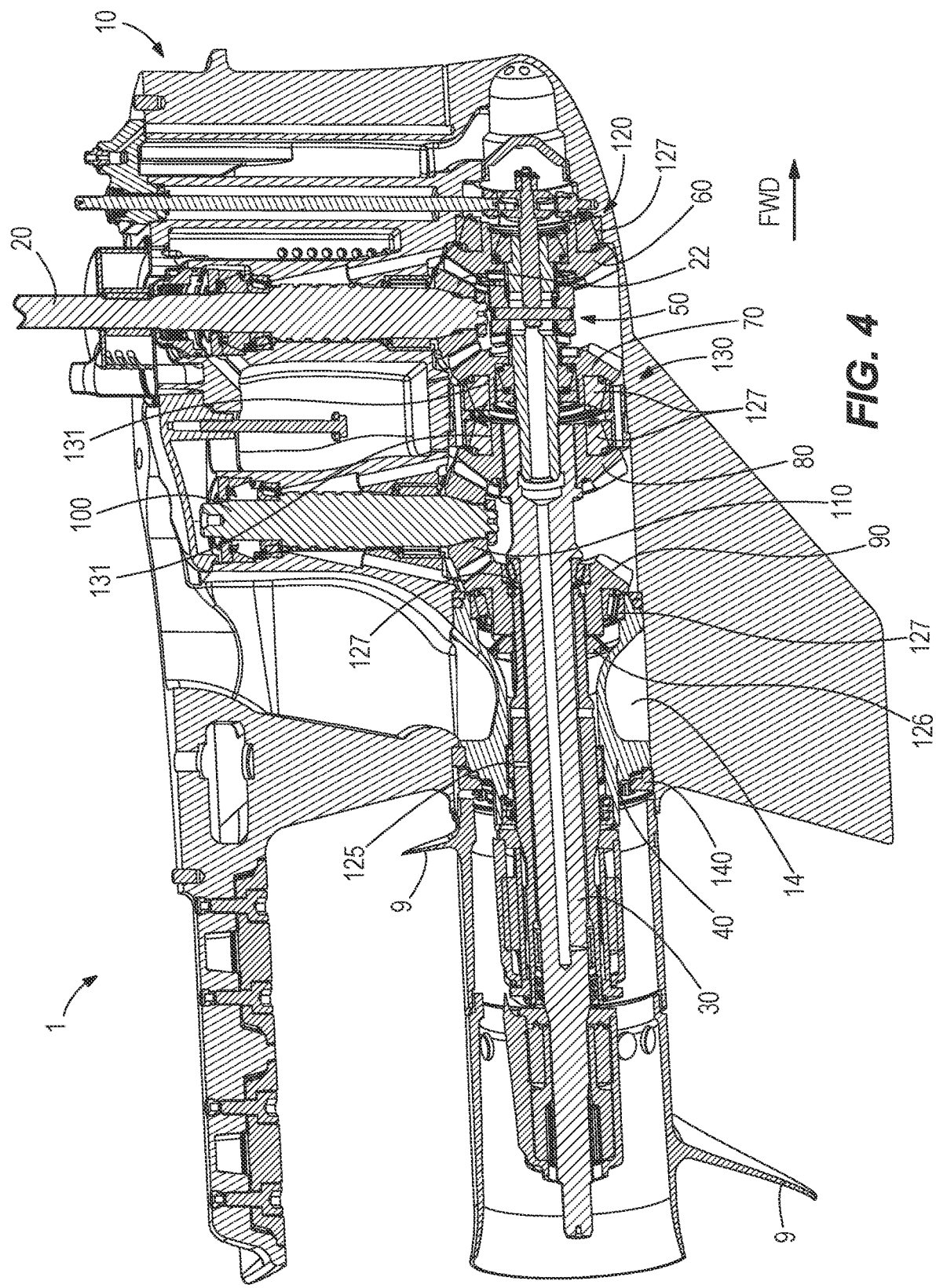
FIG. 4 is a sectional side view taken along the line 4-4 from FIG. 1.

With reference to FIGS. 3 and 4, the stub shaft 50 has a forward extension 52 (FIG. 3) configured for rotatably supporting the forward end 51 of the stub shaft 50 via forward bearings 120 (see FIG. 4). The forward extension 52 is configured to be rotatably supported by an interior of the forward bearing 120 in a manner similar to the intermediate mid bearing 130 discussed above. The stub shaft 50 further defines an outer engagement feature 54 at an opposite aft end 53 that is opposite the forward end 51. In the embodiment shown, the outer engagement feature 54 is splined, though tabs, threads, or other types of engagement features are also possible for the same functions. A corresponding inner engagement feature 34 is provided on the forward end 31 of the inner propeller shaft 30, which in this case is correspondingly splined to match that of the outer engagement feature 54 of the stub shaft 50. In this manner, the aft end 53 of the stub shaft 50 is partially received within the forward end 31 of the inner propeller shaft 30 such that rotation is transmitted directly from the stub shaft 50 to the inner propeller shaft 30.

As discussed above, the forward end 31 of the inner propeller shaft 30 further includes an outer engagement feature 32, which in the present example also incorporates splines. The splines of the outer engagement feature 32 of the inner propeller shaft 30 are configured to be received within corresponding inner engagement features 84 within the outer driving gear 80, and particularly within a forward extension 82 thereof. Like the forward extension 52 of the stub shaft 50, the forward extension 82 of the outer driving gear 80 provides a surface for rotatably supporting the outer driving gear 80, and through engagement also the inner propeller shaft 30 and outer propeller shaft 40, as well as the aft end 53 of the stub shaft 50, via mid bearings 130 (FIG. 4). As is discussed further below, the forward bearings 120, mid bearings 130, and aft bearings 140 include different combinations of roller or radial bearings 125, thrust bearings 126, and/or taper bearings 127 as would be known in the art. However, the presently disclosed system 1 and methods enable the incorporation of additional bearings, and particularly mid bearings 130, which could not be installed but for the incorporation of a stub shaft 50 as presently disclosed.

FIG. 4 further depicts the incorporation of bearings of different types and at multiple locations along the lengths of the inner propeller shaft 30 and outer propeller shaft 40, as well as the stub shaft 50. In particular, the presently disclosed configuration allows for the installation of mid bearings 130 provided between the stub shaft 50 and the inner propeller shaft 30, which provides support for the inner propeller shaft 30 in a position that was not previously able to be accomplished with systems presently known in the art. This prevents the deflection of the inner propeller shaft 30 and outer propeller shaft 40 under load, thereby ensuring the integrity of meshing between the driveshaft gear 20 and the inner propeller shaft 30 and outer propeller shaft 40 by way of engagement with the reverse gear 60, forward gear 70, outer driving gear 80, and outer driven gear 90.

FIG. 4 further depicts the incorporation of forward bearings 120 and aft bearings 140, which as previously discussed include radial bearings 125, thrust bearings 126, and taper bearings 127. By incorporating the stub shaft 50 presently described, support can be provided to the inner propeller shaft 30 and outer propeller shaft 40 at this centralized position while nonetheless permitting the inner propeller shaft 30 and outer propeller shaft 40 to be installed via the aft opening 12 defined in the aft end 13 of the gearcase 10

Figure 6:
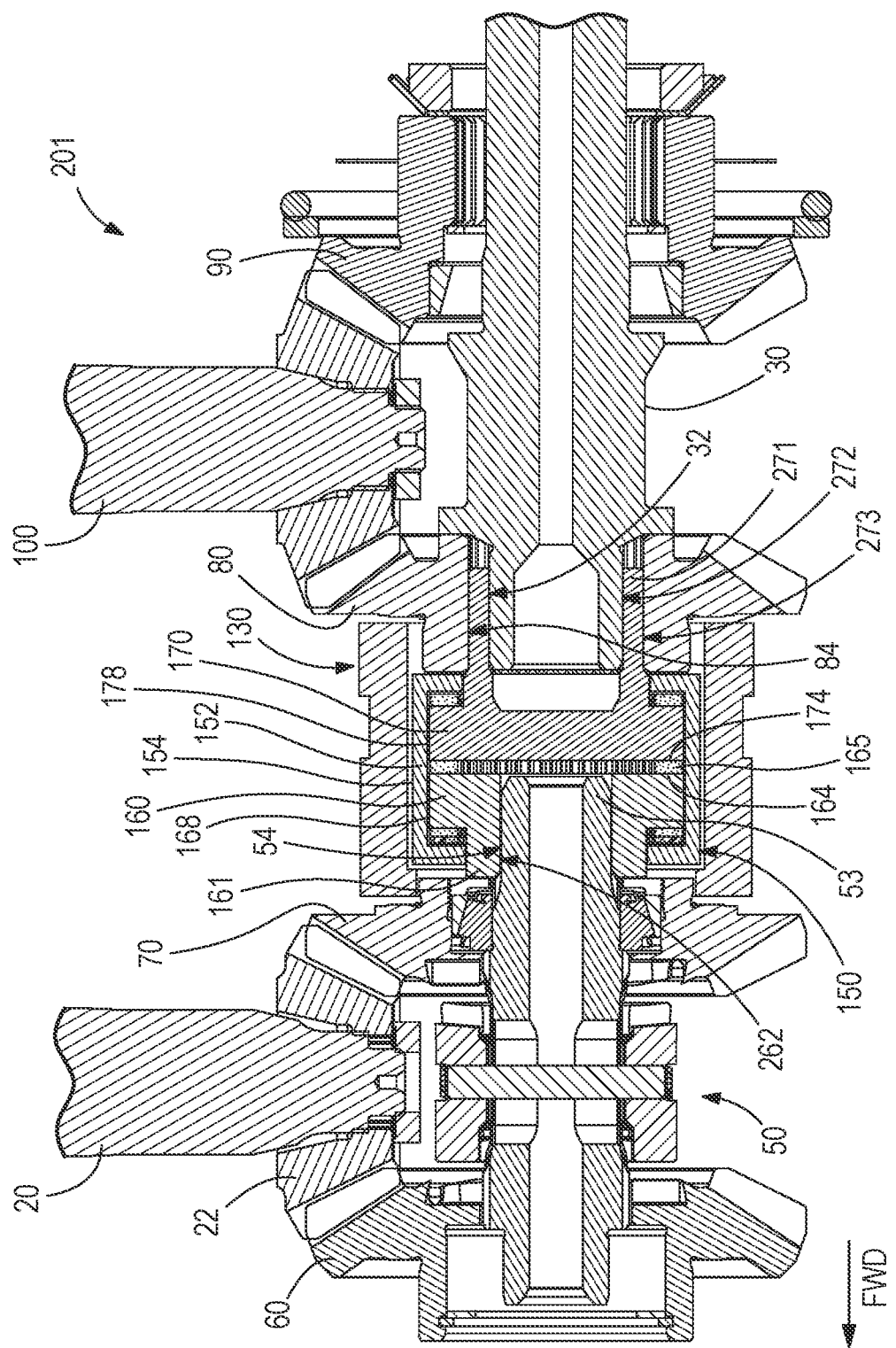
FIG. 6 is a close up sectional side view similar to that of FIG. 4, but for the alternative embodiment shown in FIG. 5.
Figure 7:
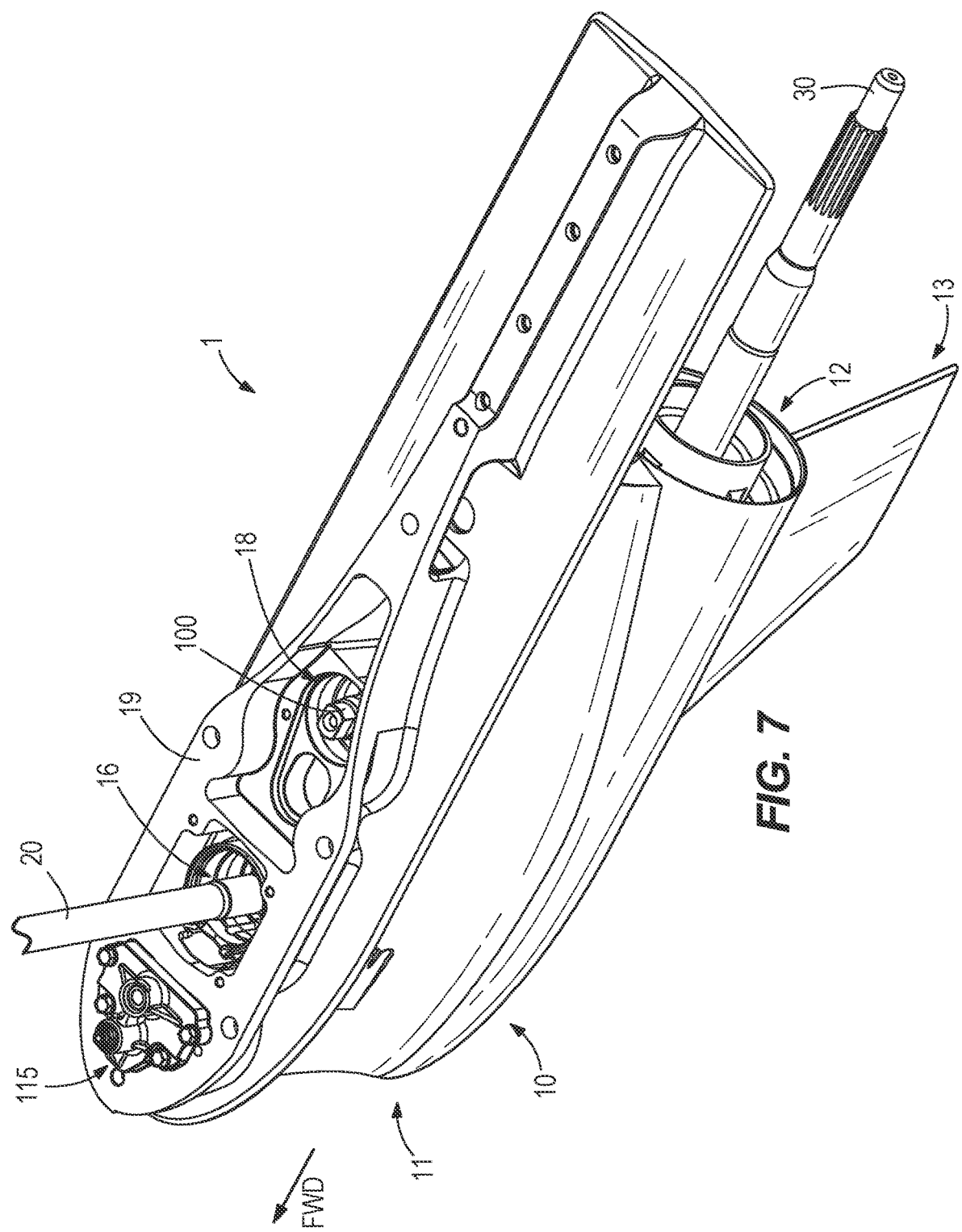
FIG. 7 is an isometric view of a portion of a marine propulsion device taken from an opposite side compared to FIG. 1, now with the propellers removed.

(see FIG. 7). As also shown in FIG. 6, the system 1 further provides access for engagement of the inner propeller shaft 30 and outer propeller shaft 40 (as well as stub shaft 50) to the drive gear 22 of the driveshaft 20, and the pinion gear 110 of the pinion shaft 100 via a driveshaft opening 116 and a pinion shaft opening 118, respectively, defined within the mounting surface 19 of the gearcase 10. Once again, this provides access to the meshing of the various gears and bearings for a solid gearcase 10 having access from the aft opening 12.

The present inventors have identified further improvements to systems and methods presently known in the art based on the incorporation of stub shaft 50 as discussed above. In a typical dual, counter-rotating propeller shaft configuration, there is limited space within the gearcase 10 for providing a flexible propeller hub on the outer propeller shaft 40 (for the front propeller 9). This is in part due to the large shaft size, or in other words, the larger diameter of this outer propeller shaft 40 required to pass engine exhaust through the propeller 9. A flexible propeller hub is desirable in that it reduces shift "clunk", and also the likelihood of clutch rattle, by changing the effective torsional spring rate between the clutch and the coupled (and relatively large) inertia of the propeller 9. There is further concern that the shift clunk of a dog clutch engagement, for example, may be even greater with a dual, counter-rotating propeller driveshaft gearcase 10 over that of a traditional single propeller gearcase 10. Specifically the counter-rotating configuration results in a greater inertial load due to the additional shafts, gears, and propellers. The inventors believe that this greater inertial load would then result in reduced durability of the gearcase 10 components, due to the additional loading during clutch 115 engagement.

In contrast to the coupling between the stub shaft 50 and the inner propeller shaft 30 previously discussed, the system 201 of FIGS. 5 and 6 provides coupling between the stub shaft 50 and the inner propeller shaft 30 via the shock absorbing coupler 150. In the embodiment shown, the shock absorbing coupler 150 is a flexible grid coupling, such as a Falk FlexSteel Grid Couplers (e.g., a Falk T10 Model). The shock absorbing coupler 150 shown includes an annular housing 152 that defines an internal cavity 154 therein, the annular housing 152 extending between a forward end 151 and an aft end 153. The shock absorbing coupler 150 is configured to be received and retained within the interior surface 131 defined within the intermediate mid bearing 130.

Other torsional devices, such as those containing elastomers, may also be modified to be used as the shock absorbing coupler 150. For example, Mercury Marine's Flo-Torq IV isolators absorb shock via titanium rods overmolded with an elastomer. It will be recognized that the packaging for the Flo-Torq IV may be modified (e.g., with spines, threads, and/or the like) to be integrated into another embodiment similar to that shown in FIGS. 5 and 6.

Returning to the example of FIGS. 5 and 6, a forward disc 160 and an aft disc 170 are contained within the internal cavity 154 of the shock absorbing coupler 150, which include inner faces 164, 174 that face each other, as well as opposing outer faces 162, 172. A gap 165 is formed between the forward disc 160 and the aft disc 170. Additionally, the forward disc 160 and the aft disc 170 define slots 166, 176 defined within the perimeters of respective outer surfaces 168, 178. A flexible coil 180 is alternatively woven between the slots 166, 176 such that the forward disc 160 and aft disc 170 have limited torsional rotation with respect to each other as a function of the flexible coil 180 flexing.

A forward extension 261 extends forwardly from the forward disc 160 and defines inner engagement features 262 therein. The aft end 53 of the stub shaft 50 is received within the forward extension 261 and the outer engagement feature 54 of the stub shaft 50 engages with the inner engagement features 262 such that the stub shaft 50 and the forward disc 160 rotate together. Similarly, an aft extension 271 extends rearwardly from the aft disc 170 and defines both inner engagement feature 272 and outer engagement features 273. The forward end 34 of the inner propeller shaft 30 is received within the aft extension 271, with engagement between the outer engagement feature 32 of the inner propeller shaft 30 and the inner engagement feature 272 of the aft extension 271. Likewise, the aft extension 271 is received within the outer driving gear 80 such that the outer engagement feature 273 of the aft extension 271 engages with the inner engagement feature 84 of the outer driving gear 80. As such, the outer driving gear 80 and the inner propeller shaft 30 rotate with the aft disc 170.

As previously discussed, the present inventors have identified a concern with absorbing the "clunk" between the driveshaft 20 and the inner propeller shaft 30 and outer propeller shaft 40, particularly in a dual, counter-rotating propeller configuration. The incorporation of the shock absorbing coupler 150 permits some amount of torsional flexing between the stub shaft 50 and the outer driving gear 80, which is engaged to the forward gear 70 of the stub shaft 50 through engagement with the shock absorbing coupler 150.

In this manner, rotation is still transmitted between the inner propeller shaft 30 and the outer propeller shaft 40 by the means of the pinion gear 110 coupled therebetween. However, in the system 201 of FIGS. 5 and 6, the inner propeller shaft 30 is no longer rotatably fixed with the stub shaft 50 through engagement between the outer engagement feature 54 and inner engagement feature 34 previously discussed with respect to the embodiment of FIGS. 2-4. Accordingly, the shock absorbing coupler 150 provides a desired reduction of clunk and overall shock absorption between the driveshaft 20 and the inner propeller shaft 30 and outer propeller shaft 40, while not requiring additional space within the gearcase 10.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for rotating a propeller shaft within a gearcase via a driveshaft, the system comprising:
    a stub shaft rotatable within the gearcase;
    a forward gear rotatably coupled to the stub shaft, wherein the forward gear is rotatable by the driveshaft and is engageable to become rotatably fixed to the stub shaft such that rotating the driveshaft rotates the stub shaft; and a shock absorbing coupler positioned within the gearcase, wherein the shock absorbing coupler couples the stub shaft to the propeller shaft, and wherein the shock absorbing coupler is torsional such that shock is absorbable between the propeller shaft and the driveshaft.

2. The system according to claim 1, further comprising mid bearings that rotatably support the stub shaft between the forward gear and the shock absorbing coupler.

3. The system according to claim 1, further comprising a reverse gear also rotatably coupled to the stub shaft, wherein the reverse gear is also rotatable by the driveshaft and is engageable to become rotatably fixed to the stub shaft such that rotating the driveshaft rotates the stub shaft in reverse and forward directions, respectively.

4. The system according to claim 3, further comprising clutches for selecting between engaging the forward gear to become rotatably fixed to the stub shaft and engaging the reverse gear to become rotatably fixed to the stub shaft, respectively.

5. The system according to claim 3, wherein the propeller shaft is a first propeller shaft, further comprising:
a driving gear that is coupled to the first propeller shaft to rotate therewith;
a second propeller shaft that is rotatable within the gearcase;
a driven gear coupled to the second propeller shaft to rotate therewith; and
a pinion rotatably coupling the driving gear to the driven gear such that rotation of the driving gear rotates the second propeller shaft.

6. The system according to claim 5, wherein the first and second propeller shafts rotate in opposite directions to each other.

7. The system according to claim 5, wherein the shock absorbing coupler is a grid coupler.

8. The system according to claim 5, further comprising mid bearings that rotatably support the stub shaft between the forward gear and the driving gear.

9. The system according to claim 8, further comprising forward bearings and aft bearings that rotatably support the stub shaft on opposite sides of the mid bearings.

10. The system according to claim 9, wherein the forward bearings bias the reverse gear in a first direction and the mid bearings bias the forward gear in a second direction opposite the first direction such that the reverse gear and the forward gear are preloaded against each other.

11. The system according to claim 5, wherein the shock absorbing coupler is axially positioned between the forward gear and the driving gear.

12. The system according to claim 5, wherein rotation of the driveshaft causes the first and second propeller shafts to rotate in opposite directions.

13. The system according to claim 5, wherein the shock absorbing coupler is contained entirely within the gearcase.

14. The system according to claim 5, wherein the shock absorbing coupler is also configured to absorb shock between the second propeller shaft and the driveshaft.

15. A marine propulsion device having a rotatable driveshaft, the marine propulsion device comprising:
a gearcase;
a propeller shaft rotatably contained within the gearcase;
a stub shaft rotatable within the gearcase;
a reverse gear and a forward gear each rotatably coupled to the stub shaft, wherein the reverse gear and the forward gear each mesh with the driveshaft and are engageable to become rotatably fixed to the stub shaft such that rotating the driveshaft rotates the stub shaft in reverse and forward directions, respectively;
a shock absorbing coupler that couples the stub shaft and the propeller shaft, wherein the shock absorbing coupler is torsional to allow some rotation of the propeller shaft relative to the driveshaft; and
clutches for engaging the forward gear to become rotatably fixed to the stub shaft and engaging the reverse gear to become rotatably fixed to the stub shaft, respectively.

16. The marine propulsion device according to claim 15, further comprising mid bearings that rotatably support the stub shaft.

17. The marine propulsion device according to claim 15, wherein the gearcase has a forward end and an aft end, wherein an aft opening is defined within the aft end of the gearcase, and wherein the stub shaft, the shock absorbing coupler, and the propeller shaft are insertable into the gearcase via the aft opening.

18. A method for making a marine propulsion device with shock absorption for a propeller shaft rotatable by a driveshaft within a gearcase, the method comprising:
positioning a stub shaft within the gearcase, wherein the stub shaft has a reverse gear and a forward gear rotatably coupled thereto, wherein the reverse gear and the forward gear mesh with the driveshaft and are engageable to become rotatably fixed to the stub shaft such that rotating the driveshaft rotates the stub shaft in reverse and forward directions, respectively;
positioning the propeller shaft within the gearcase; and
coupling the stub shaft to the propeller shaft via a shock absorbing coupler to rotate together within the gearcase, wherein the coupler is torsional to allow some rotation of the propeller shaft relative to the driveshaft.

19. The method according to claim 18, wherein the gearcase has forward and aft ends, and wherein an aft opening is defined within the aft end, further comprising positioning the stub shaft in the gearcase via the opening defined in the aft end.

20. The method according to claim 19, further comprising positioning mid bearings within the gearcase to rotatably support the stub shaft, and further comprising a positioning a clutch within the gearcase for selecting between engagement of the driveshaft with the reverse gear and engagement of the driveshaft with the forward gear.

* * * * *